United States Patent
Garcia Pedraja et al.

(10) Patent No.: US 6,230,008 B1
(45) Date of Patent: May 8, 2001

(54) DUAL FIXED/MOBILE COMMUNICATIONS SYSTEM

(75) Inventors: Fidel Garcia Pedraja; Alfredo Redondo Iglesias, both of Madrid; José Luis Gomez Solera, Algete, all of (ES)

(73) Assignee: Alcatel N.V., Rijswijk (NL)

( * ) Notice: Subject to any disclaimer, the term of this patent is extended or adjusted under 35 U.S.C. 154(b) by 0 days.

(21) Appl. No.: 08/459,361

(22) Filed: Jun. 2, 1995

(30) Foreign Application Priority Data

Jul. 27, 1994 (ES) .................................................... 9401654

(51) Int. Cl.[7] .............................. H04Q 7/26; H04B 7/155
(52) U.S. Cl. ......................... 455/426; 455/465; 455/11.1
(58) Field of Search ................................. 379/60, 58, 59, 379/61; 455/417, 426, 462, 465, 552, 11.1

(56) References Cited

U.S. PATENT DOCUMENTS

| | | |
|---|---|---|
| 4,284,848 | 8/1981 | Frost .......................................... 179/2 |
| 4,369,520 * | 1/1983 | Cerny, Jr. et al. ............. 455/276.1 X |
| 4,528,656 * | 7/1985 | Morais ................................. 379/58 X |
| 4,539,706 | 9/1985 | Mears et al. ............................. 455/11 |
| 4,748,655 * | 5/1988 | Thrower et al. ................... 379/58 X |
| 4,827,499 * | 5/1989 | Warty et al. ............................. 379/58 |
| 4,922,517 * | 5/1990 | West, Jr. et al. ......................... 379/58 |
| 4,972,456 * | 11/1990 | Kaczmarek et al. .................... 379/59 |
| 5,212,684 * | 5/1993 | MacNamee et al. ................... 379/61 |
| 5,243,641 * | 9/1993 | Evans et al. .............................. 379/60 |
| 5,369,803 | 11/1994 | Hirasawa et al. ....................... 455/89 |
| 5,463,674 * | 10/1995 | Gillig et al. ............................. 379/59 |

FOREIGN PATENT DOCUMENTS 0506443   9/1992   (EP) .

* cited by examiner

Primary Examiner—William R. Korzuch
Assistant Examiner—Martin Lerner
(74) Attorney, Agent, or Firm—Ware, Fressola, Van Der Sluys & Adolphson LLP

(57) ABSTRACT

A dual fixed/mobile communications system comprises a set of base stations (BS) connected to a local exchange (LE), and a set of wireless terminal stations (WTS) that communicate, by radio, with the base stations (BS) in order to provide telephone services to telephone sets (T) connected, by means of subscriber lines (LS), to the wireless terminal stations (WTS). These wireless terminal stations (WTS) are inhibited when use is made of cordless telephones (WT) which, in an alternative form, communicate directly with the base stations (BS) when they are located within their area of coverage. The wireless terminal stations (WTS) can also include a radio transceiver RT through which a cordless telephone (WT)[1] which is outside the coverage of the base stations (BS), can communicate with them.

5 Claims, 3 Drawing Sheets

DUAL FIXED/MOBILE COMMUNICATIONS SYSTEM

TECHNICAL FIELD

This invention relates to a communications system for access to the public switched network, through which a conventional fixed telephone set obtains access to the switched public network by means of a terminal fixed station that is connected, by radio, to a set of base stations of a wireless communications system.

BACKGROUND OF THE INVENTION

One of the major problems that telecommunications operating companies faced with is the need to install infrastructures to give service in certain areas of low subscriber density where the economic return is very poor as a result of the widespread geographical distribution of the customers.

This is particularly the case in the access part of the network in environments with a certain demand where, in addition, the installation and provision of these services have to be implemented rapidly.

To resolve these problems, in recent years use has been made of what is normally termed radio access, in which a set of base stations of wireless communications systems (cellular, point to multipoint, etc.) provide radio coverage for a certain zone in which are installed a number of "special" wireless terminals, which are cordless terminals of the type normally used in such communications systems but into which a line interface circuit has been incorporated, while personal interfaces (microphone, loudspeaker, keypad, display element) have been suppressed. This line interface performs the functions of conversion required for both directions of transmission, so that, from a conventional telephone set connected to this terminal, it is possible to offer the same kind of functions as with a fixed telephone connected directly to the public switched network.

Among these functions are to be found those of four-to-two wire conversion, user signal tone generation, dial signal conversion, etc.

In this way it is possible to have a set of fixed telephones that have access to the public switched network by means of a wireless communications network. There is no mobility provided by this communications network, so that a new wireless communications system would be necessary with the consequent duplication of equipment and the possible saturation of the radiofrequency spectrum, should the subscribers also wish to have cordless telephones to provide a desired mobility within an area similar to that covered by the wireless network.

DISCLOSURE OF INVENTION

The object of this invention is to develop, on the actual system infrastructure described above, functions of mobility within a closed area constituted by the same set of base stations as are employed to implement the access part of the fixed terminals to the network.

The system according to the invention comprises a set of base stations that are connected to a local telephone exchange, and a set of wireless terminal stations which communicate, by radio, with at least one of the base stations in order to offer thereby telephone services to telephone sets connected, by subscriber lines, to the wireless terminal stations. In this system, the wireless terminal stations are inhibited or enabled by control means depending on whether or not a cordless telephone is used which, in an alternative form to that of the wireless terminal stations, also communicates directly with the base stations in the event that these cordless telephones are to be found inside the area of coverage of any of the system base stations.

When the cordless telephones are outside the range of any of the system base stations, the wireless terminal stations have, in addition, and so as to offer a certain local mobility, a radio transceiver that works as a repeater and which is activated by the control means when the cordless telephone is used to communicate with the base stations through the wireless terminal station and the radio transceiver.

In this way it is possible to provide mobility for fixed terminals that make use of wireless access in determined zones of coverage and even outside these zones. A given subscriber can have a fixed conventional telephone or, if he so prefers, a mobile telephone in the area of coverage of a base station system and in an area of coverage of a small repeater that allows a degree of local mobility.

In addition, by the use of radio transceivers of the type dislcosed herein, which incorporate directional antennas, it is possible to extend the area of coverage economically to any subscriber geographically isolated from the base stations, at the extremity of which a wireless terminal station is connected and to which a fixed telephone set is connected in a manner similar to that described above.

BRIEF DESCRIPTION OF THE DRAWING

The system so formed is of special application in the network access part where a wireless communications system of the DECT (Digital European Cordless Telecommunications) type is used.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
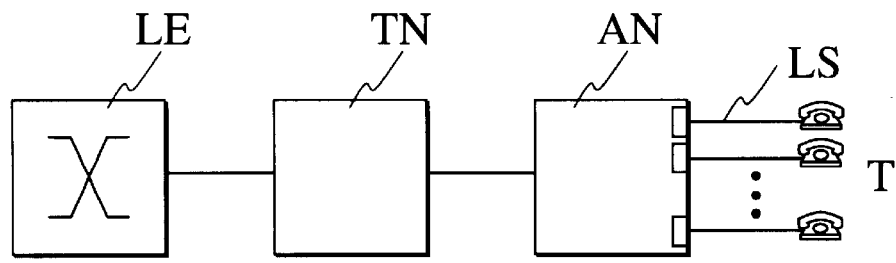
FIG. 1 shows, in schematic form, the infrastructure of a public known switched network for providing telephone service for a number of terminals.

FIG. 1 shows, as mentioned above, the infrastructure of a switched known communications network to provide service for fixed telephone sets. To achieve this, the fixed telephone sets T are connected by corresponding subscriber lines LS to the access network AN. This connection is made by means of line interfaces which, mainly, adapt received signalling, supply appropriate levels of direct current and voice signals, etc.

The access network AN communicates with a local exchange LE over a transport network TN such that all the subscribers are connected to the local exchange LE in order to be able to make and receive telephone calls to or from another subscriber connected to the telecommunications network.

Figure 2:
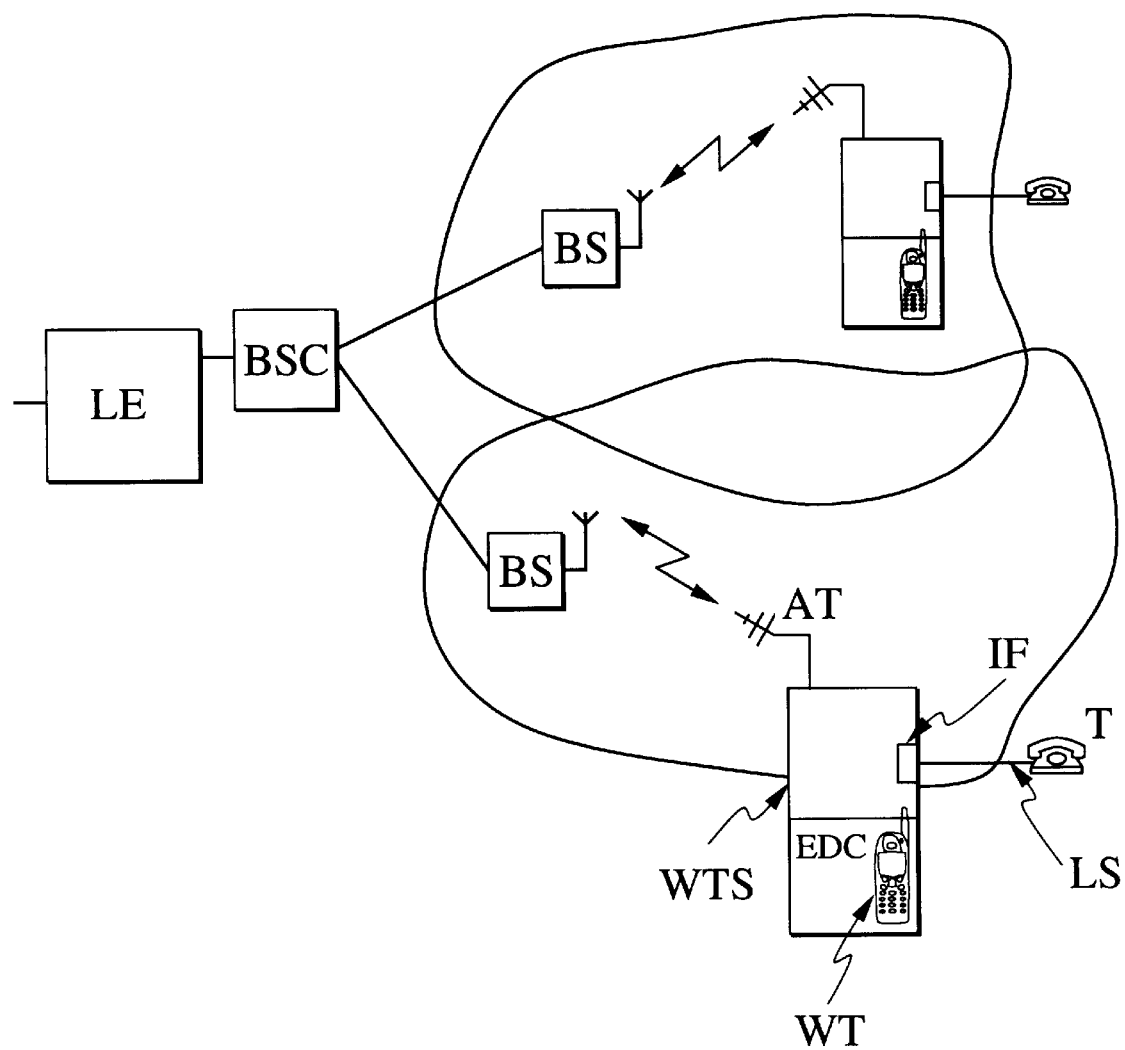
FIG. 2 shows the access part of the network of FIG. 1 using radio access in the known manner, in which a terminal station, with a suitable interface, provides a subscriber line to which a conventional telephone set is connected.

When the subscribers are distributed over a relatively broad area, the cost of installing the access network AN is very high. To reduce this cost it has become the practice in recent years to make use of radio access, as shown in FIG. 2, in which a number of base stations BS, that provide coverage for a certain area, are connected to the local exchange LE by means of a base station controller BSC that manages their operation.

In this way a wireless terminal station WTS is basically a cordless telephone of the kind used in this type of network, but powered from the electricity mains through its corresponding power supply unit and a set of batteries to permit operation in the event of a mains blackout. In addition, it is normal practice to use directional antennas (in contrast to standard cordless telephones, that use omnidirectional ones) in order to attain a range greater than the cell coverage and also minimise any interference that could be produced in, or picked up from, other wireless networks. This is feasible because the wireless terminal station WTS is always fixed in position and does not need to be mobile.

In order to provide a subscriber line LS with conventional features (two-wire communications, DC current, user signalling tones, dialling, etc.), the wireless terminal station WTS is equipped with an interface IF that performs the functions mentioned above: four-to-two wire conversion, connection of a 48 V output from the power supply to the line, interpretation of signalling information received from the base stations BS in order to activate a tone generator and emit the equivalent voice frequency tone of a conventional subscriber, translation of dial pulses into the format required for transmission over the wireless network, etc.

In the implementation described hereunder, the wireless system is of the DECT (Digital European Cordless Telecommunications) type, and results in a fairly economical system despite its complexity, in the light of the anticipated market environment.

As a wireless terminal station WTS also has a cordless telephone WT that is functionally compatible with the latter, it is possible that telephone communications could be established either from the telephone terminal T by means of the cordless terminal station WTS, or from the cordless telephone WT itself.

The wireless terminal station WTS also includes control means EDC whereby it can be enabled or inhibited, depending on the state of a detector on top of which the cordless telephone WT should rest; thus, if the cordless telephone WT is lifted from its cradle, for example to make a call, the latter no longer depresses the detector and the control means EDC inhibits the wireless terminal station WTS in order to allow communications to be made directly through the cordless telephone WT.

Figure 3:
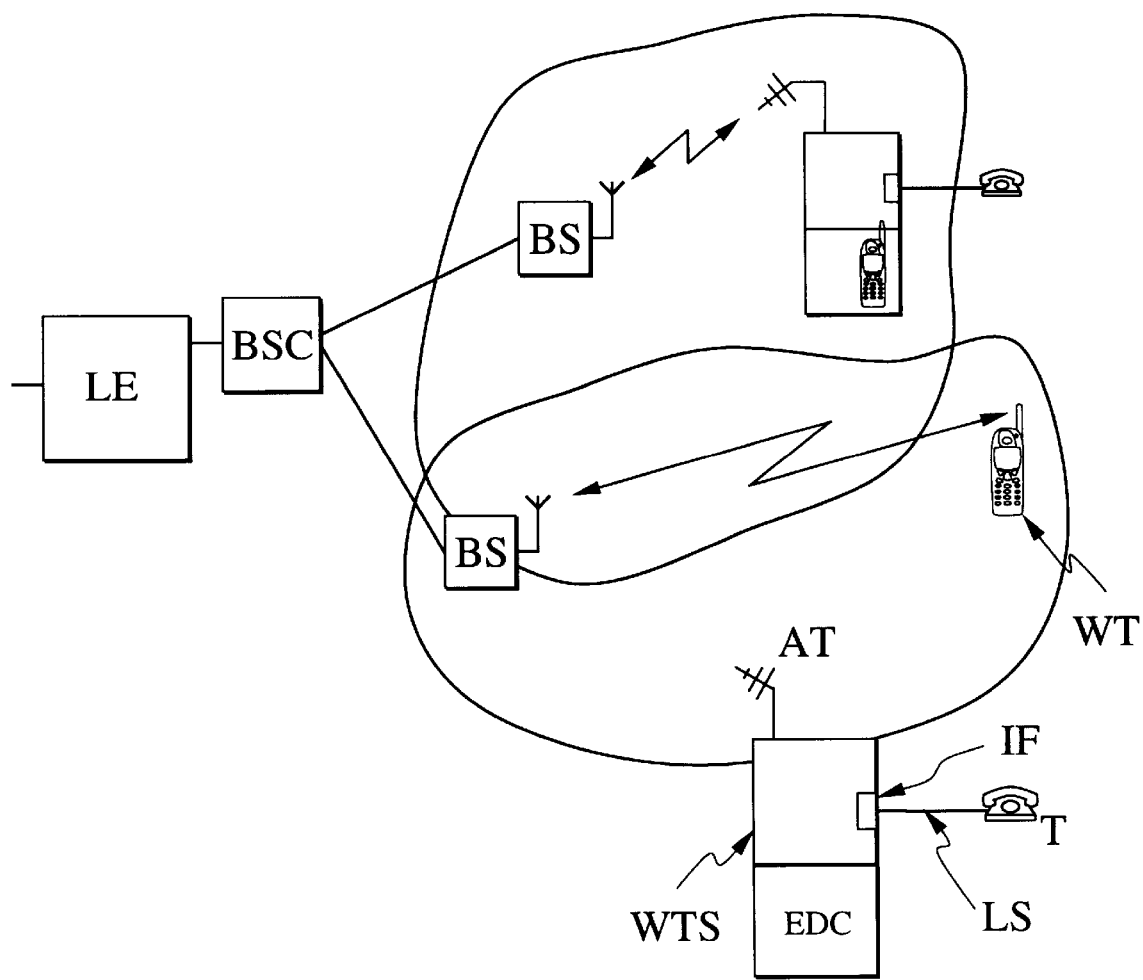
FIG. 3 shows the access part of the network similar to the above, but in which the communications are established directly with a cordless telephone, according to the invention.

Logically this is possible when the cordless telephone WT is inside the area of coverage of one of the base stations BS of the wireless system. This situation is illustrated in FIG. 3.

Figure 4:
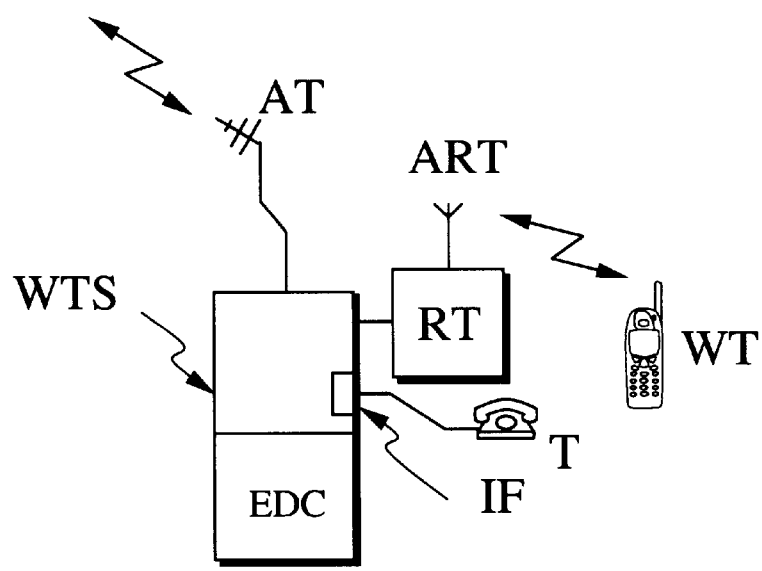
FIG. 4 is a wireless terminal station of the type employed for radio access to the network, which incorporates a radio repeater to offer service with local mobility for a cordless telephone, according to the invention
Figure 5:
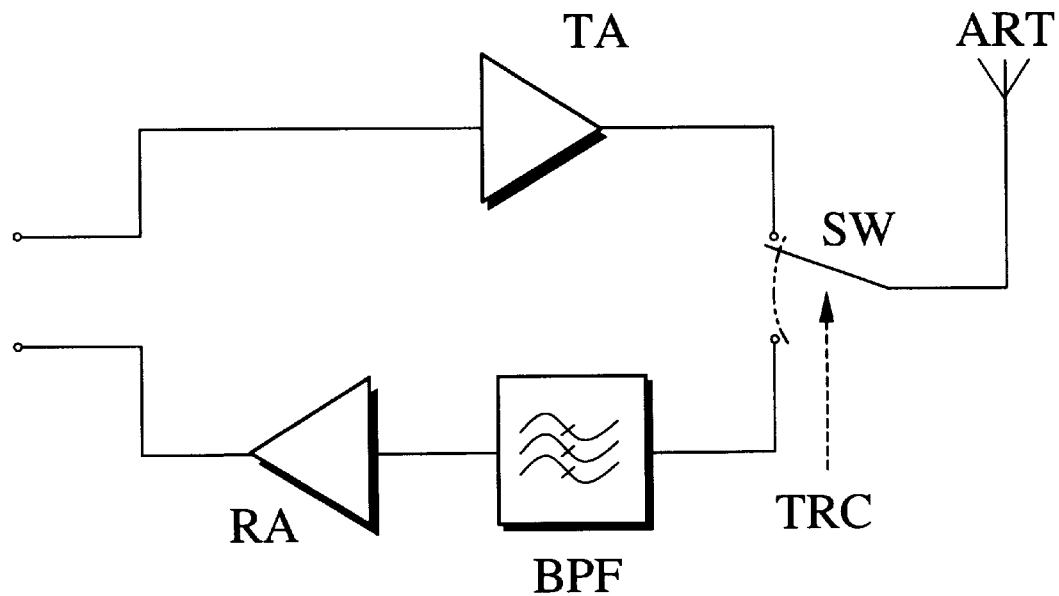
FIG. 5 shows the block diagram of a radio transceiver used as a repeated along with the wireless terminal station according to the invention.

When the subscriber is located outside the area of coverage of all the base stations BS, its wireless terminal station WTS must obligatorily be equipped with a directional antenna as stated above. In these situations, the cordless telephone WT cannot contact with any base station, consequently communication would not be possible. To resolve this predicament, and provide an identical service in the eyes of the subscriber, the wireless terminal station WTS also includes a radio transceiver RT, as is shown in FIG. 4, so that the unit acts as a two way repeater for communications between the base station BS and the cordless telephone WT. If the coupling of the electromagnetic field between the two antennas, directional in the case of the wireless terminal station WTS and omnidirectional in the case of the radio transceiver RT, is sufficiently low, this radio transceiver acts simply as a two-way repeater. This is shown in FIG. 5 in which the signal coming from the antenna ART of the radio transceiver RT, originated in the cordless telephone WT, is filtered in a bandpass filter BPF, amplified in a receive-side amplifier RA and applied to the transmitter of the wireless terminal station WTS; and the signal, also at radiofrequency, coming from the input amplifier of the wireless terminal station WTS, is amplified in a power amplifier TA and applied to the antenna ART of the radio transceiver RT.

There is also a switch SW, shown schematically in the above indicated figure, that receives a transmit/receive control signal TRC coming from the wireless terminal station WTS in order to select the appropriate path in each case, transmission in one case and reception in the other.

When the coupling between the two antennas, that belonging to the wireless terminal station WTS and that belonging to the radio transceiver RT, is not sufficiently low, as in a cordless DECT system, it would be necessary to perform much more complex conversion functions than those required in analog systems (generally frequency translation), because the frequencies and the channels over which the radio communications are made between base station and terminal are not fixed, but are indicated in the actual information being transmitted between them.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Communications system, comprising: a number of base stations (BS) connected to a local exchange (LE) and a number of wireless terminal stations (WTS) that communicate, by radio, with at least one of the base stations (BS) in order to provide telephone services to telephone sets (T) connected by subscriber lines (LS) to the wireless terminals stations (WTS), wherein said wireless terminal stations (WTS) are inhibited or enabled by control means (EDC) depending on whether or not a cordless telephone (WT) is being used which, in an alternative manner to that of the wireless terminal stations (WTS), also communicates directly with the base stations (BS).

2. Communications system according to claim 1, wherein the control means includes an idle state detector which enables or inhibits the corresponding wireless terminal station (WTS), respectively, when the cordless telephone (WT) is or is not mounted on said idle state detector.

3. Communications system comprising: a number of base stations (BS) connected to a local exchange (LE) and a number of wireless terminal stations (WTS) that communicate, by radio, with at least one of the base stations (BS) in order to provide telephone services to telephone sets (T) connected by subscriber lines (LS) to the wireless terminal stations (WTS), wherein said wireless terminal stations (WTS) are connected to a low power radio transceiver (RT) that acts as a repeater and which is enabled by control means (EDC) when a cordless telephone (WT) is used in order to, in an alternative manner, communicate with the base stations (BS) by means of the wireless terminal station (WTS) and the radio receiver (RT).

4. Communications system according to claim 3, wherein the control means (EDC) includes an idle state detector which inhibits or enables the corresponding radio transceiver (RT), respectively, when the cordless telephone (WT) is or is not mounted on said idle state detector.

5. Communications system according to claim 3, wherein an antenna (AT) of the wireless terminal stations (WTS) is of a directional type and is pointed toward an antenna of one of the base stations (BS) in order to achieve a greater range than that of an equivalent cordless telephone (WT) that has an omnidirectional type antenna, while an antenna (ART) of the radio transceiver is of a non-directional type in order to cover a small area in an immediate vicinity.

\* \* \* \* \*

UNITED STATES PATENT AND TRADEMARK OFFICE
CERTIFICATE OF CORRECTION

PATENT NO. : 6,230,008 B1  Page 1 of 1
DATED : May 8, 2001
INVENTOR(S) : Garcia Pedraja et al.

It is certified that error appears in the above-identified patent and that said Letters Patent is hereby corrected as shown below:

Item [57], ABSTRACT,
Please delete "(WT)' " and insert -- (WT), --.

Signed and Sealed this

Thirtieth Day of April, 2002

*Attest:*

*Attesting Officer*

JAMES E. ROGAN
*Director of the United States Patent and Trademark Office*